Patented Aug. 29, 1950

2,520,666

UNITED STATES PATENT OFFICE 2,520,666

GAMMA,GAMMA-DICARBALKOXY BUTYR-ALDEHYDES AND PROCESS

Donald T. Warner and Owen A. Moe, Minneapolis, Minn., assignors to General Mills, Inc., a corporation of Delaware No Drawing. Application November 6, 1948, Serial No. 58,816

10 Claims. (Cl. 260—483)

The present invention relates to various intermediate aldehyde compounds which are particularly useful in various organic syntheses. The aldehydes contemplated by the present invention may be represented by the following structural formula:

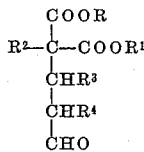

in which R and $R^1$ are low alkyl groups containing from one to four carbon atoms, $R^2$ may be hydrogen or an aliphatic hydrocarbon group containing from one to twenty or more carbon atoms, and $R^3$ and $R^4$ may be hydrogen or methyl.

The aldehyde compounds of the present invention are useful in numerous ways. In view of the high functionality of the molecule, it is possible for them to enter into many typical organic reactions, and they thus serve as useful intermediates in further organic syntheses. One of the compounds of the present invention, namely, gamma,gamma - dicarbethoxybutyraldehyde is particularly useful in the synthesis of biotin as will be pointed out more fully hereinafter.

It is, therefore, an object of the present invention to provide novel aldehyde compounds having the above general formula.

It is a further object of the present invention to provide a novel process of producing such compounds.

These aldehydes may be prepared by the 1,4 addition of malonic esters and substituted malonic esters to alpha,beta-unsaturated aldehydes such as acrolein, methacrolein, and crotonaldehyde, which results in the direct production of the desired aldehyde. These reactions are carried out in the presence of an alkaline catalyst such as alkali metal alkoxides, tertiary amines, or quaternary ammonium compounds. The reaction conditions are subject to considerable variation depending upon the reactants and upon the type of catalyst employed. In general, best yields of the aldehyde compounds are obtained when the amount of catalyst is held within the range of approximately 0.001 to 0.10 mole per mole of reagent used. This is a preferred catalyst range and is preferred particularly for the stronger catalysts such as the alkali metal alkoxides. Where weaker alkaline catalysts such as the tertiary amines or the quaternary ammonium compounds are used, more leeway in the amount of catalyst employed is possible. Furthermore, this molar proportion of catalyst is more critical in the case of the unsubstituted malonic esters than it is in the case of the alkyl substituted malonic esters. Generally, it is desirable to employ as small a quantity of catalyst as is conveniently possible inasmuch as larger quantities tend to enhance the possibility of a Knoevenagel reaction. The amount of catalyst is less critical in the case of the alkyl substituted malonates since they possess only a single reactive hydrogen on the active methylene, and this in itself retards 1,2 addition. In the case of the weaker alkaline catalysts such as the tertiary amines, for example tributylamine, it has been found that the amount of catalyst which may be employed is considerably greater on the molar basis than that set forth above without any adverse effect on the yield.

The type of malonic system also has some effect on the particular catalyst to be employed. For example, the alkyl substituted malonates react better in the presence of the more basic catalysts in view of the decreased acidity of the second hydrogen on the active methylene group. Weaker alkaline catalysts result in slower rates of reaction and in poorer yields with alkyl substituted malonates than do the more strongly alkaline catalysts. Of the amino catalysts, those which have a tertiary or quaternary nitrogen atom are preferred inasmuch as the compounds do not in themselves undergo reactions with the alpha,beta-unsaturated aldehydes.

The temperature employed during the addition reaction is likewise subject to change depending upon other conditions. Generally, however, a temperature of 0–10° C. is desirable. This is particularly true for the unsubstituted malonic esters, since the employment of this temperature avoids side reactions which have an adverse effect upon yield. For the alkyl substituted malonates, however, the reaction proceeds very smoothly and rapidly at temperatures up to 50° C. Since, however, temperatures above 50° C. may result in the loss of reactants, it is preferred not to exceed this temperature, and in general, for the alkyl substituted malonic esters it has been found that temperatures of 30–50° C. may be employed without adversely affecting the yield.

The reaction is carried out in the presence of a suitable solvent diluent which does not enter into the reaction. Almost any solvent diluent which meets this test can be employed. Suitable solvents include alcohols, such as ethanol, ethers such as diethyl ether, and hydrocarbon solvents such as benzene. The amount of solvent employed may be varied considerably. Usually it is desired to employ a quantity of solvent at least equal in volume to the malonic ester employed.

More often, the amount of solvent is several times the amount of the malonic ester. In the case of the unsubstituted malonic esters, it is preferred to employ a larger quantity of solvent inasmuch as this is of assistance in preventing the formation of the diaddition product.

In carrying out the reaction it is preferred to prepare a solution of the malonic ester in the solvent and to add the catalyst to this solution. The resultant solution is then cooled to a suitable temperature, depending upon the temperature at which it is desired to carry out the reaction. The unsaturated aldehyde is then added slowly to this solution over an extended period of time. In this way it is possible to control the temperature of the reaction mixture very readily to somewhere within the desired range and thus to control the reaction in the desired direction. After the reaction has been completed, the catalyst may be neutralized and the product worked up in conventional manner.

The reaction is applicable to such alpha,beta-unsaturated aldehydes as acrolein, methacrolein, and crotonaldehyde. The alcoholic group of the malonic ester may be either methyl, ethyl, propyl, or butyl. However, inasmuch as malonic ester is conventionally available in the form of the ethyl ester, this form of compound is preferred. The aliphatic hydrocarbon substituent on the malonic methylene group may be varied from one to twenty or more carbon atoms. Since, however, one of the most practical ways of forming the substituted malonic esters (Floyd & Miller, J. A. C. S. vol. 69, page 2354 (1947)) involves the reaction of a low aliphatic ester of a fatty acid with an oxalate ester, the resultant aliphatic hydrocarbon substituent is two carbon atoms shorter than the fatty acid from which it is derived, and accordingly it is preferred not to employ aliphatic hydrocarbon substituents having more than sixteen carbon atoms in view of the scarcity of fatty acids from which such malonic esters may be derived. It will be apparent, however, that if higher aliphatic hydrocarbon substituents are desired they can be obtained from the less readily available fatty acids having the suitable chain lengths. There are, of course, other methods of preparing the alkyl substituted malonic esters and if desired, these may be employed.

The following examples will serve to illustrate the invention:

Example 1

A solution of sodium ethoxide was prepared from 60 ml. absolute ethanol and 0.05 g. sodium. To this solution ethyl hexadecylmalonate (19.2 g.) was added and the mixture was cooled to +2° C. The cooled mixture was reacted with crotonaldehyde (3.5 g.) added dropwise over a 5 minute period. The reaction was allowed to proceed for an additional 0.5 hours at +2° C., and then the catalyst was neutralized by the addition of 0.5 g. of glacial acetic acid. The solution was evaporated in vacuo on a steam bath, and gamma-hexadecyl-beta-methyl-gamma,gamma-dicarbethoxy-butyraldehyde was obtained as a light yellow oil.

2.6 g. of this light yellow oil was reacted with 0.5 g. of 2,4-dinitrophenylhydrazine, and the 2,4-dinitrophenylhydrazone of gamma-hexadecyl-beta-methyl-gamma,gamma-dicarbethoxybutyraldehyde was obtained as a crystalline compound which melted at 89–90° C. after recrystallization from ethanol.

Calc. for $C_{33}H_{54}O_8N_4$: C, 62.43; H, 8.57; N, 8.83; Found: C, 62.17; H, 8.51; N, 9.09.

Example 2

A solution of sodium ethoxide (0.04 g. of sodium reacted with 90 cc. absolute ethanol) was mixed with ethyl ethylmalonate (37.6 g.) and the mixture was cooled. Crotonaldehyde (14.1 g.) was added dropwise to the stirred solution with cooling. After the crotonaldehyde had been introduced an additional quantity of sodium ethoxide (from 0.13 g. Na in 10 ml. absolute ethanol) was added, and the reaction was allowed to proceed to completion. The catalyst was neutralized with glacial acetic acid, and the ethanol was removed in vacuo. The residue was dissolved in benzene (175 cc.) and the benzene solution was washed with three 50 cc. portions of water. The benzene layer was dried, the solvent was removed in vacuo, and the residue was distilled. The desired product was collected at 80–92° C. (0.06–0.07 mm.). A portion of this product was treated with 2,4-dinitrophenylhydrazine in the usual manner, and the 2,4-dinitrophenylhydrazone of gamma-ethyl-gamma,gamma-dicarbethoxy-beta-methylbutyraldehyde was obtained as a crystalline product which melted at 116–117° C. after crystallization from ethanol.

Calc. for $C_{19}H_{26}O_8N_4$: C, 52.05; H, 5.98; N, 12.78; Found: C, 51.70; H, 5.94; N, 12.75.

Example 3

Five hundred cc. of absolute ethanol were mixed with 0.1 gram of metallic sodium. When all of the sodium had reacted, 128.1 grams of ethyl malonate were added and the resulting solution was cooled to 0° C. To this cold solution 43.9 grams of acrolein (containing 1% hydroquinone) were added dropwise over a period of 2½ hours. The acrolein was added at such a rate that the temperature could be maintained between 0–5° C. When the addition of the alpha,beta-unsaturated aldehyde was complete, the reaction mixture was stirred for an additional 5 hours at 0–5° C. The catalyst was then neutralized by the addition of 0.5 gram of glacial acetic acid. After the neutralization of the catalyst the reaction mixture was concentrated in vacuo to a rather viscous residue.

A small portion of this viscous residue was treated with 2,4-dinitrophenylhydrazine to yield the crude 2,4-dinitrophenylhydrazone which separated as an oily material. After rigorous purification by repeated crystallizations from absolute alcohol the pure 2,4-dinitrophenylhydrazone of gamma,gamma-dicarbethoxybutyraldehyde melted at 74–75° C.

Gamma,gamma-dicarbethoxybutyraldehyde was purified by distillation in the following manner. Six hundred cc. of benzene were added to the above viscous residue and the benzene solution washed with four 100 cc. portions of water. After the water washings the benzene solution was dried over anhydrous sodium sulfate. The sodium sulfate was removed by filtration and the clear benzene filtrate was concentrated in vacuo and the residual viscous oil distilled at a low pressure. The first fraction containing a small amount of diethyl malonate was discarded. The main fraction was collected over the range 98–105° C. at 0.2–0.3 mm. The residual oil remaining in the distillation flask possessed a slightly yellow color and began to decompose at 105° C. at which time the distillation was interrupted.

The main fraction of the distillate was redistilled and the desired product was collected over the range 77–80° C. at 0.08 mm. An analytical sample prepared by a further distillation showed a boiling point of 75–76° C. at 0.07 mm. and $n_D^{25}$ 1.4345. The compound was further characterized by the preparation of the 2,4-dinitrophenylhydrazone which melted at 75–76° C.

Example 4

An alcoholic solution containing 200 parts of absolute ethyl alcohol, 0.04 parts of sodium, and 75.1 parts of ethyl ethylmalonate were cooled to —1° C. Acrolein (23.5 parts) was added over a 45-minute period at such a rate that the reaction temperature was maintained between 0° C.–4° C. The final reaction mixture was stirred for an additional hour in an ice bath and then placed in the refrigerator for a period of 14 hours. After standing for 14 hours, the catalyst was neutralized by the addition of one part of glacial acetic acid. The alcohol was removed by distillation under diminished pressure. The residual oil was mixed with 400 parts of benzene and the benzene solution was extracted with water. The benzene solution was then dried over anhydrous sodium sulfate and finally removed by distillation under diminished pressure. The residual oil which was subjected to fractional distillation under diminished pressure weighed 88.6 parts. Distillation yielded approximately 67 parts of distillate which was collected over the range of 60–100° C. at 0.2 mm. The very viscous residue weighed 19 parts. The distillate was subjected to another distillation under diminished pressure and five fractions were obtained. The first fraction which was collected at 47–54° C. at 0.1 mm. weighed 7 parts and proved to be substantially ethyl ethylmalonate. The second fraction which was collected at 54–70° C. at 0.08 mm. weighing approximately 6 parts was presumably a mixture of the unreacted malonic ester and the desired aldehydo compound. The third fraction which was collected at 70–75° C. at 0.07 mm. weighed 15 parts and had a $n_D^{25}$ 1.4372. The fourth fraction which was collected at 75–75.5° C. at 0.07 mm. weighed approximately 19 parts and had a $n_D^{25}$ 1.4386. Sample 5 which was collected at 75.5–77° C. at 0.07 mm. weighed approximately 16 parts and had a $n_D^{25}$ 1.4394. The last three fractions, 3, 4, and 5, proved to be substantially pure gamma,gamma - dicarbethoxy - caproaldehyde. The aldehydo compound was characterized as the 2,4-dinitrophenylhydrazone which was prepared in the conventional manner. The purified dinitrophenylhydrazone of gamma,-gamma-dicarbethoxy-caproaldehyde melted at 100.5–101.5° C.

Example 5

Metallic sodium (0.04 part) was added to 200 parts of absolute ethanol. After all of the sodium had reacted, 64.4 parts of ethyl malonate were added and the reaction mixture was cooled to 0° C. Crotonaldehyde (28.5 parts) was added dropwise over a 35-minute period. The temperature of the reaction mixture was maintained at approximately 0° C. during the addition of the alpha,beta-unsaturated aldehyde. After stirring for a period of three hours, the reaction mixture was neutral to litmus and an additional portion (0.040 part) of sodium was added. The resulting reaction mixture was then placed in the refrigerator overnight. The alkaline catalyst was neutralized by the addition of 1.5 parts of glacial acetic acid. After neutralization the reaction mixture was evaporated in vacuo to yield 71.4 parts of viscous oil. The viscous oil was dissolved in 250 parts of benzene and the benzene solution was washed with water. After drying over anhydrous sodium sulfate, the benzene was removed by distillation and the residual oil was distilled in vacuo. The first fraction was collected over the range 40–90° C. at 0.15–.30 mm. and the desired fraction was collected at 90–105° C. at 0.3–0.5 mm. A portion of the desired fraction was treated with 2,4-dinitrophenylhydrazine in a conventional manner. The 2,4-dinitrophenylhydrazone of gamma,gamma-dicarbethoxy - beta - methylbutyraldehyde thus obtained melted at 89.5–90° C. after purification.

Example 6

32 g. of ethyl malonate were added to an alcoholic solution containing 50 cc. of absolute ethanol and 40 mg. of sodium. The resulting reaction mixture was cooled to 6° C., then 11 cc. of alpha-methyl acrolein were added dropwise with stirring and cooling over a 25 minute period. The temperature of the reaction mixture was not permitted to rise above 9° C. during the addition of the alpha, beta-unsaturated aldehydo compound. After the addition of the aldehyde was complete the reaction mixture was maintained at approximately 10° C. for a period of two hours. The reaction mixture was neutralized with 10 drops of glacial acetic acid and then permitted to stand at room temperature overnight. The water-white alcoholic solution was concentrated in vacuo. The residual oil was dissolved in 100 cc. of benzene and the benzene solution was abstracted with two 50-cc. portions of water. After drying over anhydrous sodium sulfate the benzene was removed in vacuo to yield 38 g. of a residual oil. The residual oil was subjected to distillation under diminished pressure and the desired product, gamma,gamma-dicarbethoxy-alpha-methylbutyraldehyde, was collected at 97–110° C. at 0.1–0.4 mm.

The aldehydo compound was characterized as the 2,4-dinitrophenylhydrazone employing conventional procedures. The derivative was obtained in the form of orange needles melting at 90.5–92° C. The product was recrystallized from absolute ethanol yielding light orange needle clusters which melted at 90.5–91° C. This 2,4-dinitrophenylhydrazone was analyzed.

Analysis calculated for $C_{17}H_{22}O_8N_4$: C, 49.73; H, 5.40; N, 13.65; Found: C, 49.78; H, 5.52; N, 14.04.

Example 7

37.6 g. of ethyl ethymalonate were added to an alcoholic solution containing 100 cc. of absolute ethanol and 0.05 g. of metallic sodium. The resulting reaction mixture was cooled to 4° C. The alpha-methyl acrolein (17.6 cc.) was added dropwise with stirring. The temperature of the reaction mixture rapidly increased to 11° C. even though it was cooled in an ice bath. The addition of the aldehydo compound was accomplished over a 15 minute period and the temperature of the reaction mixture was maintained at 10–11° C. by means of external cooling. After stirring for an additional hour the reaction mixture was acidified by the addition of the requisite amount of glacial acetic acid. A clear colorless solution resulted.

A portion of the above alcoholic solution of the aldehydo compound was treated with 2,4-dinitrophenylhydrazine in accordance with conventional procedures and the resulting 2,4-dinitrophenylhydrazone was obtained as orange-yellow needles. After purification the 2,4-dinitrophenylhydrazone melted at 79.5–81° C. This derivative of the aldehydo compound was analyzed.

Analysis calculated for $C_{19}H_{26}O_8N_4$: C, 52.05; H, 5.98; N, 12.78; Found: C, 52.05; H, 6.09; N, 13.11.

Example 8

Ethyl hexylmalonate (9.65 g.) was added to 30 ml. of absolute ethanol containing sodium ethoxide (prepared from 20 mg. of metallic sodium). The resulting reaction mixture was cooled to 0° C. and acrolein (2.24 g.) was added dropwise. The reaction mixture was cooled for 16 hours. The catalyst was neutralized with glacial acetic acid and concentration of the resulting solution in vacuo yielded a residual oil. A portion of this residual oil, when treated with 2,4-dinitrophenylhydrazine, yielded a 2,4-dinitrophenylhydrazone melting at 86–87° C. This was the 2,4-dinitrophenylhydrazone of gamma, gamma-dicarbethoxy-gamma-hexyl - butyraldehyde.

Anal. calcd. for $C_{22}H_{32}O_8N_4$: C, 54.96; H, 6.70; Found: C, 54.45; H, 6.70.

0.1 mole of the crude gamma,gamma-dicarbethoxy-gamma-hexylbutyraldehyde was dissolved in 50 cc. of absolute ethanol. To the resulting alcoholic solution there was added 0.1 mole (11.3 g. of ethyl cyanoacetate and 1 cc. of glacial acetic acid). The resulting solution was cooled to 10° C. and 0.5 g. of piperidine was added in small portions. When the addition of piperidine was complete, 1 g. of 5% palladium on charcoal was introduced, and the mixture was hydrogenated at an initial pressure of 40 pounds of hydrogen. After three hours the reduction was substantially complete and the catalyst was removed by filtration. The resulting filtrate was concentrated in vacuo. The condensation-reduction product, namely ethyl-alpha-cyano - epsilon,epsilon - dicarbethoxy-dodecanoate was obtained as a very viscous oil.

Example 9

160 parts of absolute ethanol were reacted with 0.1 parts of metallic sodium. When the sodium had reacted, 114.1 parts of diethyl decylmalonate were added and the solution was cooled to 0° C. To the cold solution, 23.5 parts of acrolein were added at such a rate that the temperature remained between 0° and +5° C. The reaction mixture was cooled at +3° C. for an additional 60 hours. The catalyst was then neutralized by the addition of one part of glacial acetic acid, and the reaction mixture was concentrated in vacuo on a water bath. The residual oil was dissolved in benzene, and the solution extracted with water, after which the benzene solution was dried over anhydrous sodium sulfate. After filtering the sodium sulfate, the benzene was removed by evaporation in vacuo. The residual oil was subjected to distillation at approximately 0.5 mm. to remove the excess diethyl decylmalonate. The crude aldehyde compound was obtained as a residue weighing 99.0 parts, $n_D^{25}$ 1.4542.

51.9 parts of crude aldehydo compound (gamma - decyl - gamma, gamma - dicarbethoxy butyraldehyde) were dissolved in 40 parts of 95% ethanol. 1.5 parts of glacial acetic acid and 20.3 parts of ethyl cyanoacetate were added. The solution was cooled to 8° C. and 0.5 parts of piperidine were added in small portions. When the addition was complete, 1.4 parts of 5% palladium on charcoal were introduced; and the mixture was hydrogenated at an initial pressure of 37 pounds of hydrogen. Approximately 75% of the theoretical hydrogen was absorbed in a 20-hour period. The catalyst was removed by filtration and the filtrate was concentrated to a syrup. This syrup was dissolved in ether, and the solution was extracted with a 5% sodium chloride solution. The ether layer was dried over anhydrous sodium sulfate, filtered, and the ether was removed by evaporation on a steam bath. The residue was subjected to distillation at 0.7 mm. The main fraction boiled at 205–218°/0.7 mm., $n_D^{25}$ 1.4534. Redistillation yielded purified ethyl-alpha-cyano-epsilon, epsilon-dicarbethoxy hexadecanoate, B. P.=184–187° C./0.08 mm., $n_D^{25}$ 1.4531.

Example 10

11.5 g. of ethyl hexadecylmalonate were dissolved in 50 cc. of absolute ethanol. A solution of sodium ethoxide (0.04 g. of sodium in 10 cc. of absolute ethanol) was added. The resulting reaction mixture was cooled to 5° C. Acrolein (1.7 g.) was added dropwise. The temperature of the reaction increased to 9° C. After stirring at 5° C. for a period of three hours, the reaction mixture was neutralized by the addition of the requisite quantity of glacial acetic acid. The ethanol was removed by concentration in vacuo and the gamma,gamma-dicarbethoxy-gamma-hexadecylbutyraldehyde was obtained as a viscous oil. A portion of this oil was mixed with 2,4-dinitrophenylhydrazine in a conventional manner and the resulting hydrazone was obtained as a viscous oil which solidified on standing. Recrystallization from ethanol yielded the 2,4-dinitrophenylhydrazone melting at 60–63° C.

0.1 mole of the crude gamma,gamma-dicarbethoxy - gamma - hexadecylbutyraldehyde was dissolved in 50 cc. of absolute ethanol. To the resulting alcoholic solution there was added 11.3 g. (0.1 mole) of ethyl cyanoacetate and 1 cc. glacial acetic acid. The resulting solution was cooled to 5° C. and 0.4 g. of piperidine was added in portions. When the addition of piperidine was complete, 1 g. of 5% palladium on charcoal was added and the mixture was hydrogenated at an initial pressure of 33.8 pounds. After approximately two hours, the reduction was complete and the catalyst was removed by filtration and the filtrate was concentrated in vacuo. The resulting condensation-reduction product was obtained as a very viscous oil.

Example 11

To a mixture of 250 ml. of benzene and 188 g. of ethyl ethylmalonate, a sodium ethoxide solution (prepared from 0.1 g. of sodium and 5 ml. of absolute ethanol) was added, and the resulting clear mixture was cooled to 0° C. Redistilled acrolein (56.4 g.) was added dropwise over a 35 minute period while the temperature of the reaction mixture was maintained within the range of 0–10° C. throughout the addition. After 16 hours at approximately 0° C., the reaction mixture was neutralized with 1 g. of glacial acetic acid. The benzene solution was extracted with four 100 ml. portions of dilute acetic acid (2 ml. of acetic acid in 100 cc. of solution). This was followed by two extractions with water. The benzene layer was then dried with 50 g. of anhydrous sodium sulfate. The benzene was removed in vacuo and the residual oil was distilled in vacuo. The aldehydo compound (gamma,-gamma-dicarbethoxy-caproaldehyde) was collected over the range of 80° C./0.17 mm. to 97° C./0.42 mm.

Example 12

Ethyl malonate (160 g.) was dissolved in 1,000 cc. of ethyl ether containing sodium ethoxide (prepared from 0.2 g. of sodium and 10 cc. of absolute ethanol). The reaction mixture was cooled to 5° C. Acrolein (56 g.) was added dropwise at such a rate that the temperature did not exceed 10° C. After the addition of the acrolein was complete, the reaction mixture was stirred for an additional 90 minutes and then was neutralized with glacial acetic acid. The ether layer was washed with two 1500 ml. portions of water. It was then dried over anhydrous sodium sulfate, filtered, and the ether removed by distillation. The residual oil was distilled under reduced pressure, and the fraction collected over the range of 60–130° C./0.9–4.0 mm. was redistilled. Redistillation yielded two fractions. The first was collected at 59–99° C./0.5–0.6 mm. and consisted of unchanged ethyl malonate and some gamma,-gamma-dicarbethoxybutyraldehyde. The second fraction collected at 100–102° C./0.5–0.6 mm. was gamma,gamma-dicarbethoxybutyraldehyde. $n_D^{25}=1.4345$.

Example 13

Diethylmalonate (480 g.) was added to 1500 ml. of benzene containing sodium ethoxide (prepared from 25 ml. of absolute ethanol and 0.3 g. of sodium). The mixture was cooled to 0° C. Acrolein (168 g.) was added dropwise while the temperature was maintained within the range of 0–10° C. When the addition was complete, the reaction mixture was stirred for two hours and neutralized with acetic acid (1.5 g.). The solution was then washed with three 1000 ml. portions of water. The benzene layer was concentrated in vacuo and the residual syrup was distilled at low pressure. Two main fractions were collected. Fraction 1 boiled at 71–100° C./0.27–0.80 mm. and fraction 2 boiled at 100–108° C./0.95–3.4 mm. Fractions 1 and 2 were combined and redistilled. The aldehydo compound, gamma,gamma-dicarbethoxybutyraldehyde, was collected at 73–83° C./0.15–0.22 mm.

Example 14

Ethyl malonate (80 g.) was dissolved in absolute ethanol (80 ml.) and tri-n butylamine (2 g.) was added. The mixture was cooled to +12° C. and acrolein (28.6 g.) was added dropwise. The reaction temperature slowly increased to about +16° C., and the reaction mixture was cooled in a refrigerator at +3° C. for approximately 22 hours. The reaction mixture was acidified with 2 ml. of glacial acetic acid and concentrated in vacuo to remove the excess ethanol. The residual oil was dissolved in benzene (200 ml.) and washed with four 100 ml. portions of water. The benzene solution was then dried over anhydrous sodium sulfate, and distilled in vacuo. Gamma,gamma-dicarbethoxybutyraldehyde was collected over the boiling range of 110–126° C. (0.7–1.45 mm.).

Example 15

Ethyl malonate (480 g.) was dissolved in benzene (1200 ml.) containing 1 ml. of piperidine. The mixture was cooled to 5° C. and acrolein (168 g.) added dropwise. There was no immediate temperature rise so an additional 2 ml. of piperidine was added. The temperature increased to 9° C. At the conclusion of the acrolein addition, another 2 ml. of piperidine was added and the mixture was allowed to react for an additional 3 hour period. The catalyst was then neutralized with glacial acetic acid and the benzene solution was washed with two 100 ml. portions of water. The benzene solution was dried over anhydrous sodium sulfate, and the benzene was removed by distillation in vacuo. The product was collected over the range of 115–138° C. (4.0–8.0 mm.). Redistillation yielded pure gamma,gamma-dicarbethoxybutyraldehyde collected at 101–103° C. (0.9–1.05 mm.) $n_D^{25}=1.4344$.

As has been indicated previously, the various aldehyde compounds of the present invention are useful in further syntheses in view of the high functionality of the molecule. For example, the gamma,gamma-dicarbethoxybutyraldehydes are particularly useful in the synthesis of biotin in accordance with the following generally indicated synthesis. The indicated product of this synthesis is a recognized intermediate for the production of biotin.

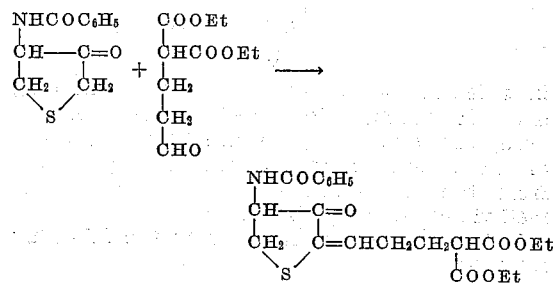

It is also apparent that the compounds of the present invention having an aliphatic hydrocarbon substituent may be used to produce novel compounds similar to biotin, but having an aliphatic hydrocarbon substituent thereon.

Aldehyde compounds of the present invention are also useful in the synthesis of pimelic acid and more particularly substituted pimelic acids, and also in the synthesis of hydantoins in accordance with the following series of reactions:

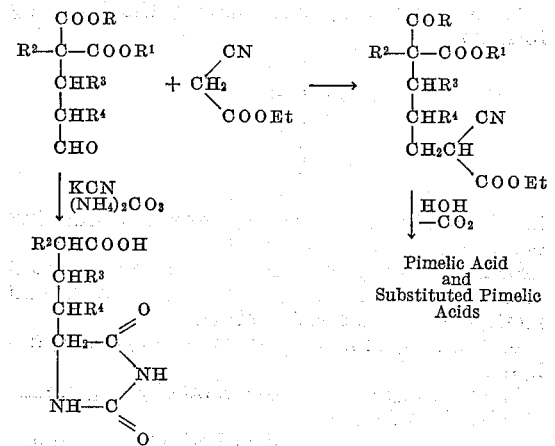

The phenylhydrazones of the aldehydes may also be employed in the preparation of substituted piperidones in accordance with the following reaction:

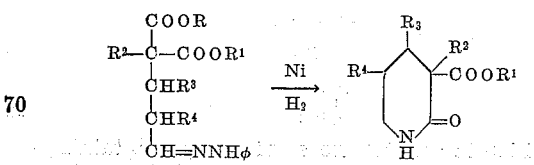

These aldehydes may also be used for the synthesis of amino acids by reacting them with HCN, which reacts with the aldehyde group to form the cyanhydrin. This compound may then be reacted with ammonia to convert the hydroxyl group to an amino group, after which the resultant compound may be subjected to hydrolysis and decarboxylation to produce various amino acids.

The present application is a continuation-in-part of our copending application, Serial No. 714,645, filed December 6, 1946, (now abandoned) entitled "Aldehydes."

While various modifications of the invention have been described, it is to be understood that other variations are possible without departing from the spirit of the invention.

We claim as our invention:

1. Aldehyde compounds having the following formula

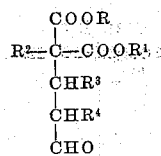

in which R and $R^1$ are alkyl groups containing one to four carbon atoms, $R^2$ is selected from the group consisting of hydrogen and aliphatic hydrocarbon groups, and $R^3$ and $R^4$ are selected from the group consisting of hydrogen and methyl but are not both methyl.

2. Aldehyde compounds having the following formula

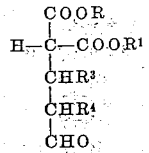

in which R and $R^1$ are alkyl groups containing one to four carbon atoms, and $R^3$ and $R^4$ are selected from the group consisting of hydrogen and methyl but are not both methyl.

3. Aldehyde compounds having the following formula

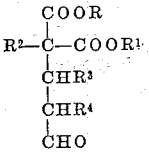

in which R and $R^1$ are alkyl groups containing one to four carbon atoms, $R^2$ is an aliphatic hydrocarbon group, and $R^3$ and $R^4$ are selected from the group consisting of hydrogen and methyl but are not both methyl.

4. Gamma,gamma - dicarbethoxybutyraldehyde.

5. Gamma,gamma - dicarbethoxy - gamma-ethyl-butyraldehyde.

6. Gamma,gamma - dicarbethoxy - gamma-decylbutyraldehyde.

7. Process of preparing aldehydes having the following formula

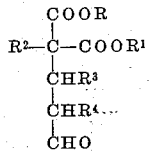

in which R and $R^1$ are alkyl groups containing one to four carbon atoms, $R^2$ is selected from the group consisting of hydrogen and aliphatic hydrocarbon groups, and $R^3$ and $R^4$ are selected from the group consisting of hydrogen and methyl but are not both methyl, which comprises reacting an alpha,beta-unsaturated aldehyde selected from the group consisting of acrolein, methacrolein, and crotonaldehyde, with a malonic ester selected from the group consisting of unsubstituted malonic esters and aliphatic hydrocarbon substituted malonic esters, in the presence of an alkaline condensation catalyst and in the presence of an organic solvent diluent, and at a temperature not substantially in excess of 50° C.

8. Process of preparing aldehydes having the following formula

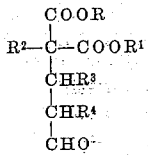

in which R and $R^1$ are alkyl groups containing one to four carbon atoms, $R^2$ is selected from the group consisting of hydrogen and aliphatic hydrocarbon groups, and $R^3$ and $R^4$ are selected from the group consisting of hydrogen and methyl but are not both methyl, which comprises preparing a solution of a malonic ester selected from the group consisting of unsubstituted malonic esters and aliphatic hydrocarbon substituted malonic esters, in an organic solvent diluent, adding an alkaline condensation catalyst thereto, gradually adding to the resultant mixture an alpha,beta-unsaturated aldehyde selected from the group consisting of acrolein, methacrolein, and crotonaldehyde, and maintaining the reaction temperature not substantially in excess of 50° C.

9. Process of preparing aldehydes having the following formula

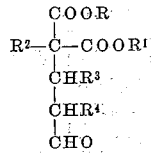

in which R and $R^1$ are alkyl groups containing one to four carbon atoms, $R^2$ is selected from the group consisting of hydrogen and aliphatic hydrocarbon groups, and $R^3$ and $R^4$ are selected from the group consisting of hydrogen and methyl but are not both methyl, which comprises preparing a solution of a malonic ester selected from the group consisting of unsubstituted malonic esters and aliphatic hydrocarbon substituted malonic esters, in an organic solvent diluent, said solution containing an alkali metal alkoxide catalyst, maintaining the temperature of the solution within the approximate range of 0–10° C., and gradually adding thereto an alpha,beta-unsaturated aldehyde selected from the group consisting of acrolein, methacrolein, and crotonaldehyde, and maintaining the temperature of the reaction mixture within the above approximate range.

10. Process according to claim 9 in which the amount of the alkali metal alkoxide catalyst is within the approximate range of 0.001 to 0.10 mole per mole of malonic ester.

DONALD T. WARNER.
OWEN A. MOE.

REFERENCES CITED

The following references are of record in the file of this patent:

Doebner, Berichte 35, 1143–1147 (1902).